Oct. 6, 1959  W. WHITSON  2,907,245

SETSCREW HAVING ANNULAR BITING EDGE AND CENTRAL CONICAL POINT

Filed Oct. 25, 1956

INVENTOR
WALTER WHITSON
BY
ATTORNEYS

United States Patent Office 2,907,245
Patented Oct. 6, 1959

2,907,245

SETSCREW HAVING ANNULAR BITING EDGE AND CENTRAL CONICAL POINT

Walter Whitson, University City, Mo., assignor to General American Transportation Corporation, Chicago, Ill., a corporation of New York Application October 25, 1956, Serial No. 618,210

5 Claims. (Cl. 85—1)

The present invention relates to setscrews, and more particularly to a novel setscrew affording improved frictional resistance or holding qualities.

One object of the invention is to provide a setscrew of this nature which embodies a novel combination of a cupped and pointed work-engaging end which creates a holding power substantially greater than that of the usual setscrew.

Another object of this invention is to provide a setscrew which is simple and inexpensive to manufacture and having its holding or biting portion so formed as to cause flow displacement of the work material into interlocking engagement with the tip end of the screw, and thereby precluding loosening of the screw by vibration factors.

A further object of the invention is to provide an improved setscrew having locking characteristics of such character as to remain functionally effective throughout many applications, removals and reapplications.

These and other objects of the invention will become more apparent as the invention is more fully described in the following specification and shown in the accompanying drawings in which.

Figure 1:
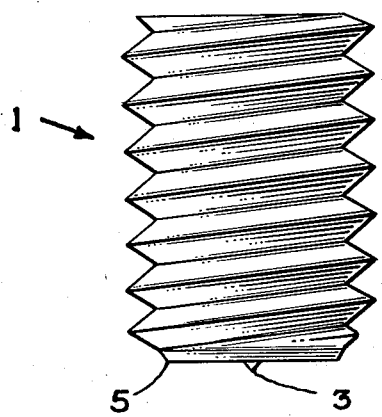
Fig. 1 is a side elevation view of one form of the invention.
Figure 2:
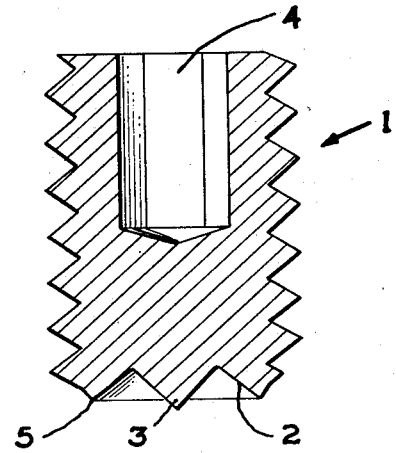
Fig. 2 is a vertical cross-section of the same form of setscrew.
Figure 3:
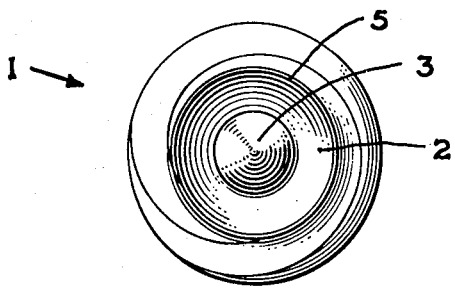
Fig. 3 is a bottom end view of the screw shown in Fig. 1.

Referring to the drawings in which like reference numerals are used to represent the same or similar parts throughout the several views, my improved setscrew 1 comprises the novel combination of a recessed or cupped end portion 2, and a conical pointed member 3 protruding preferably axially from the center of the cupped portion of the setscrew body. The screw 1 is shown as provided with a hexagonal recess 4 for receiving a suitable screw rotating wrench. Although the recess shown is for a hexagonal wrench, it is understood that the operating or driving end of the setscrew may be of any desired form, such as a head of appropriate form or a slot by which the screw member may be turned.

The work-engaging end of the setscrew, which is provided with the recessed or cupped area at 2, defines a sharp, annular biting edge 5 concentric with the axis of the screw. Within said annular edge 5 is a sharp, conical pointed member 3 which is made preferably integral with, and projecting axially forward of the screw body. Said pointed member 3 of the screw of Figs. 1 to 4 is so designed that the pointed extremity projects slightly beyond the annular biting edge 5, thereby resulting in a deeper and more positive penetration of the work material against which the screw is set. In combining a conical point 3 within a cupped or recessed area 2, it is preferable to make the recessed or cupped area somewhat larger than is generally found on the usual cup-pointed setscrew. This preferred construction insures adequate area to receive flow displacement from the work material, as will be explained more fully hereinafter; and because of the increased annular cup-biting-edge diameter, greater frictional resistance is attained upon penetration of the screw into the work material.

Figure 4:
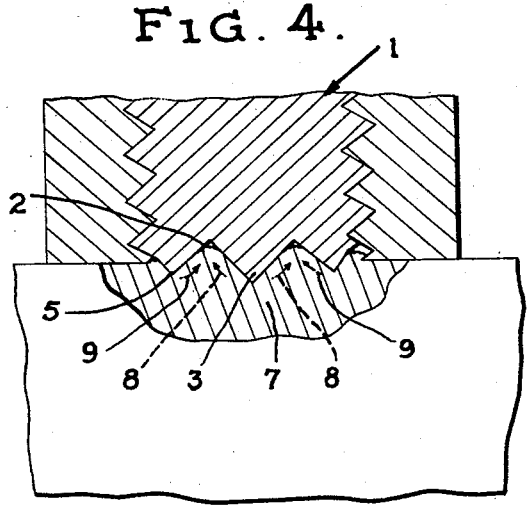
Fig. 4 is a fragmentary cross-sectional view showing the setscrew of Figs. 1 to 3 as typically applied to prevent relative movement between two members.

As seen in Fig. 4, when the setscrew 1 is tightened into the work, this novel construction produces a considerably increased frictional resistance between the screw and the work material. A positive interlocking result is obtained by the conical point effectively penetrating the work material 7, causing a flow displacement of said work material to radiate away from the point as at 8; and upon further tightening of the screw into the work, the annular biting edge 5 of the cupped area 2 bites deeper into the material 7, causing a similar displacement flow of material to radiate inwardly from the cup periphery 5 as at 9, substantially filling the cavity 2.

Upon the combining of said displacement flows, a solid interlock is effected in the recessed or cupped end of the screw, thereby imposing a very high degree of stress against the holding or biting portions of the setscrew, which in turn precludes any vibrational or other accidental loosening movement between the members.

Figure 5:
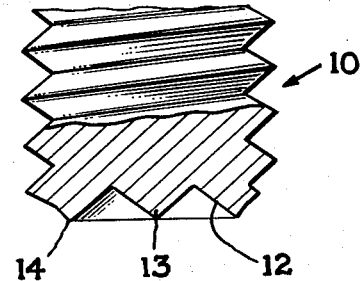
Fig. 5 is a fragmentary view, partly in cross-section and partly in elevation, of an alternative or modified embodiment of the invention.

Fig. 5 shows a modified form of setscrew having generally the same characteristics of the first described form. In the modified form, the setscrew 10 is provided with a recessed or cupped area 12 that defines preferably an axially concentric, annular biting edge 14. Projecting preferably coaxially and centrally from the recessed area is conical point 13, with said projection terminating on the transverse plane of the annular biting edge 14. This modified form of screw operates in the same manner as the first form heretofore described, except that the conical point does not penetrate as deeply as that of the former.

An advantage of using setscrews made in accordance with this invention is the very positive holding property which precludes loosening that might result from accidental bumpings or other vibrational causes. Another important advantage resides in the simplicity of this setscrew which remains functionally efficient over extended periods of repeated usage.

The invention is not limited to the exact form or arrangement of parts as disclosed in the accompanying drawings and specification, inasmuch as various changes in the details of construction and manufacture may be resorted to by those skilled in the art without departing from the spirit and scope thereof as defined in the appended claims.

I claim:

1. A self-locking setscrew, comprising an externally threaded screw body having an end provided with a frustoconical work-engaging outer surface, said end having a cavity formed in the outer extremity thereof concentrically with respect to the screw body and said outer surface, the walls of said cavity converging inwardly from the outer extremity of said end and defining with said outer surface a sharp annular biting edge on said end in a plane transverse to the central axis of the screw body, and an outwardly extended conical pointed member formed centrally within said cavity and projecting coaxially from the base thereof at least substantially to the transverse plane of said annular biting edge.

2. A setscrew as defined in claim 1, wherein said conical pointed member terminates at a coaxial point beyond the transverse plane of said annular biting edge.

3. A setscrew as defined in claim 1, wherein said conical pointed member terminates on the transverse plane of said annular biting edge.

4. A setscrew as defined in claim 1, wherein the annular biting edge is substantially V-shape in radial cross-section.

5. A setscrew as defined in claim 1, wherein three biting points are provided at the work-engaging end of the screw body on each diametrical cross-section therethrough.

References Cited in the file of this patent

UNITED STATES PATENTS

| | | |
|---|---|---|
| 855,858 | Larson | June 4, 1907 |
| 1,247,356 | Wooden | Nov. 20, 1917 |
| 1,331,189 | Farrell | Feb. 17, 1920 |
| 1,645,736 | Blanch | Oct. 18, 1927 |
| 2,201,087 | Hallowell | May 14, 1940 |
| 2,210,455 | Hosking | Aug. 6, 1940 |
| 2,354,160 | Wallgren | July 18, 1944 |
| 2,619,993 | Lombard | Dec. 3, 1952 |